United States Patent [19]

Ohara et al.

[11] Patent Number: 4,724,533
[45] Date of Patent: Feb. 9, 1988

[54] OPTICAL HEAD

[75] Inventors: Shunji Ohara, Higashiosaka; Tomio Yoshida, Katano; Takashi Ishida, Moriguchi, all of Japan

[73] Assignee: Matsushita Electric Industrial Co., Ltd., Osaka, Japan

[21] Appl. No.: 744,480

[22] Filed: Jun. 13, 1985

[30] Foreign Application Priority Data

Jun. 15, 1984 [JP] Japan ................. 59-122997
May 13, 1985 [JP] Japan ................. 60-100712

[51] Int. Cl.[4] ................................. G11B 7/09
[52] U.S. Cl. .......................... 369/45; 369/46; 369/44; 250/201; 250/202
[58] Field of Search .............. 369/46, 45, 44, 112; 250/201, 202

[56] References Cited

U.S. PATENT DOCUMENTS 4,464,741  8/1984  Compaan ................. 369/112
4,507,763  3/1985  Kato ...................... 369/46
4,612,437  9/1986  Ohsata .................... 369/45

*Primary Examiner*—Alan Faber
*Attorney, Agent, or Firm*—Spencer & Frank

[57] ABSTRACT

An optical head in which the light emitted from a light source is narrowed to a minute spot of light and applied to a recording medium such as a disk thereby to effect recording and reproduction, or reproduction alone. A focusing plate or prism is provided in the optical path for forming the image of the light reflected from the recording medium. The focusing plate or prism has a first surface which reflects and transmits the reflected light and a second surface which is located closer to the image-forming position than the first surface and reflects the reflected light which is transmitted or reflected by the first surface. The optical head is further provided with a photodetector which is divided into at least two portions which individually receive the light rays which are respectively reflected from the first and second surfaces. A focusing servo control signal is obtained from the difference between the respective outputs of the divided photodetector portions. Moreover, a tracking servo control signal is obtained from the difference between the respective outputs of the peripheral portions among the divided photodetector portions.

20 Claims, 19 Drawing Figures

OPTICAL HEAD

BACKGROUND OF THE INVENTION

1. Field of the Invention

The present invention relates to an optical reproducing apparatus which optically reads out information recorded on a disk such as a video disk, or an optical recording and reproducing apparatus which optically records information on such a disk and reproduces information recorded thereon. More particularly, the invention pertains to an optical system arranged to obtain servo control signals for actuating various servo-mechanisms and a reproduction signal by making use of the light reflected from a disk.

2. Description of the Prior Art

In general, a disk which is employed in an optical recording and reproducing apparatus, such as a video disk, has tracks which are defined by a minute spiral groove or fine concentric grooves for the purpose of recording information at a high density, the track width being, for example, 0.6 μm, and the track pitch being, for example, 1.6 μm. In the apparatus, the disk is irradiated with a minute spot of light which is narrowed to φ 1 μm or less, and information recorded on the disk is read out from the light reflected therefrom.

The apparatus described above requires at least two servo control techniques. One of them is known as a focusing servo control which is employed to allow the optical system of the apparatus to follow any undesirable undulation of the disk in the direction orthogonal to the rotating direction thereof which may occur during the rotation of the disk so that it is possible for the above-described minute spot of light, narrowed to φ 1 μm or less, to be properly applied to the disk at all times irrespective of such undulation of the disk. The other servo control technique is known as a tracking servo control which is employed to allow the optical system to follow any undesirable oscillation of the tracks in the radial direction of the disk which may occur during the rotation of the disk owing, for example, to undesirable eccentricity of the tracks whereby it is possible for the tracks to be accurately irradiated with the minute spot of light at all times independently of such oscillation of the tracks.

Servo control signals (error signals) which are employed to effect the above-described focusing and tracking servo controls are generally obtained from the light reflected from the disk. As a practical optical system designed for this purpose, one which is exemplarily shown in FIGS. 1a and 1b has heretofore been proposed.

In the optical system shown in FIGS. 1a and 1b: the reference numeral 1 denotes a light source which is, for example, constituted by a semiconductor laser; 2 a condenser lens employed to condense the laser beam emitted from the semiconductor laser; 3 a polarization beam splitter which transmits or reflects the condensed light beam in accordance with the direction of polarization of the laser beam; 4 a prism for changing the optical path; 5 a λ/4 plate; 6 a converging lens for narrowing the light beam to a minute spot of light; and 7 a disk which is irradiated with the minute spot of light, whereby a signal is recorded or a recorded signal is reproduced, or reproduction of a recorded signal alone is effected. The light reflected from the disk 7 passes through the λ/4 plate 5 again, where the direction of polarization of the light is changed, and this light is reflected by the polarization beam splitter 3 such as to pass through a convex lens 8. The light beam converged by the lens 8 is divided into two beam portions by a dividing mirror 9, and the two beam portions are respectively led to photodetectors 10 and 14. The photodetector 10 is divided into two portions 10a and 10b in such a manner that both divided portions face in the direction in which the light beam enters the same. A focusing servo control signal employed for the above-described focusing servo control is obtained from the difference between the respective outputs of the photodetector portions 10a and 10b. The photodetector 14 is also divided into two portions 14a and 14b in such a manner that both divided portions face in the direction in which the light beam enters the same. Thus, a tracking servo control signal employed for the above-described tracking servo control is obtained from the difference between the respective outputs of the photodetector portions 14a and 14b. On the other hand, a reproduction signal which represents information read out from the disk is obtained from the sum total of the four outputs of the photodetectors 10 and 14.

The optical system shown in FIG. 1, however, suffers from the following disadvantages:

(1) The focused position of the optical system is easily affected by a change in environmental conditions such as a temperature change. More specifically, in the conventional focus detecting method shown in FIGS. 1a and 1b, the distance between the disk 7 and the converging lens 6 is determined by the positional relationship, in the direction of the arrow X, between the position P of the image of the reflected light formed by the convex lens 8 and the dividing line of the photodetector 10. Incidentally, after a focused position adjustment has been properly effected by means of the photodetector 10 so that it is possible for the disk 7 to be irradiated with a minute spot of light which is optimally narrowed by the lens 6, if there is a change in environmental conditions such as a temperature change or a shock applied to the optical system, the following problems may arise: (a) the photodetector 10 may move in the direction of the arrow X; (b) the incident angle of the parallel rays entering the convex lens 8 may change; and (c) the light source 1 may move in the direction of the arrow Y. When such displacement of an optical element or an undesirable shift of the optical axis occurs, the focused position which has been properly adjusted undesirably changes, so that it becomes impossible to obtain an optimal minute spot of light on the disk, which causes a deterioration in the recording/reproducing characteristics of the optical system. The same is the case with the photodetector 14 which detects the tracking servo control signal.

(2) The S/N ratio of the focusing servo control signal is impaired. More specifically, since it is difficult to find the position of the image of the reflected light formed by the convex lens 8, the above-described positional relationship in the direction of the arrow Y between the image-forming position P and the photodetector 10 involves a wide range of variations when the optical system is actually assembled. Accordingly, when the photodetector 10 is, for example, located closer to the convex lens 8 than the image-forming position P, the photodetector portion 10b receives a beam portion which is closer to the center of the optical axis, while the photodetector portion 10a receives a beam portion which is remote from the center of the optical axis. It is generally known that the light reflected and modulated by the disk includes the greater part of the relatively low frequency components at the central portion of the cross-section of the reflected light and the greater part of the relatively high frequency components at the peripheral portion of the cross-section. In consequence, the photodetector portion 10a receives a relatively high frequency component signal, while the photodetector portion 10b receives a relatively low frequency component signal. For this reason, even if both the photodetector portions 10a and 10b are operated differentially, it is not possible to cancel the component in the reflected light which has been modulated by a signal track, a recording pit or the like on the disk, so that the modulated component appears as a noise on the focusing servo control signal. Thus, the S/N ratio of the focusing servo control signal is impaired correspondingly. The noise involved in the focusing servo control signal is undesirably applied to an actuator (not shown) which is employed to actually move the converging lens 6 in the focusing direction in accordance with the focusing servo control signal, which fact creates one of the greatest causes of generation of heat in the actuator.

SUMMARY OF THE INVENTION

In view of the above-described disadvantages of the prior art, it is a primary object of the present invention to provide a novel focusing method by which the focused position of the optical system is hardly offset at all even if an optical element is displaced or the optical axis is undesirably shifted as the result of a change in environmental conditions such as a temperature change and by which it is possible to obtain a focusing servo control signal with an excellent S/N ratio.

It is another object of the present invention to provide a novel method of detecting a reflection light signal by which it is possible for a single photodetector to serve as both a photodetector for obtaining the above-described focusing servo control signal and a photodetector for obtaining the tracking servo control signal and by which the tracking servo control signal is not affected by displacement of an optical element or an undesirable shift of the optical axis.

To these ends, the invention provides the following arrangement. Namely, a focusing prism or plate is provided in the optical path arranged to form the image of the light reflected from a disk, the focusing prism or plate having a first surface which reflects as well as transmits the light reflected from the disk and a second surface which is located closer to the image-forming position than the first surface and reflects the light transmitted or reflected by the first surface, and a photodetector is provided which is divided into at least two portions which individually receive the light rays respectively reflected from the above-described first and second surfaces, whereby a focusing servo control signal is obtained from the difference between the respective outputs of the divided photodetector portions. Further, the invention is arranged such that a tracking servo control signal is obtained from the difference between the respective outputs of the portions of the photodetector which is so divided that the cross-section of each of the light rays respectively reflected by the first and second surfaces is separated into at least two portions.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 2A:
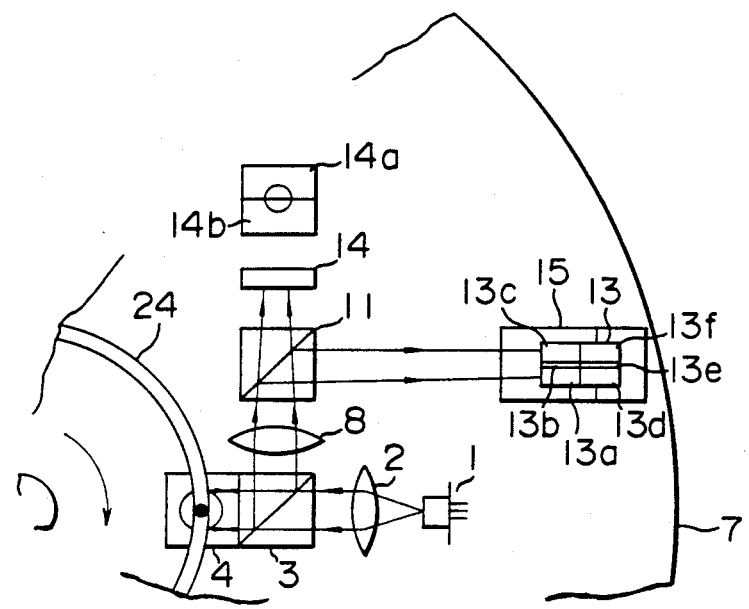
FIGS. 2a and 2b illustrate one embodiment of the present invention in which a focusing prism is employed, FIG. 2a being a front elevational view, and FIG. 2b being a side elevational view.
Figure 2B:
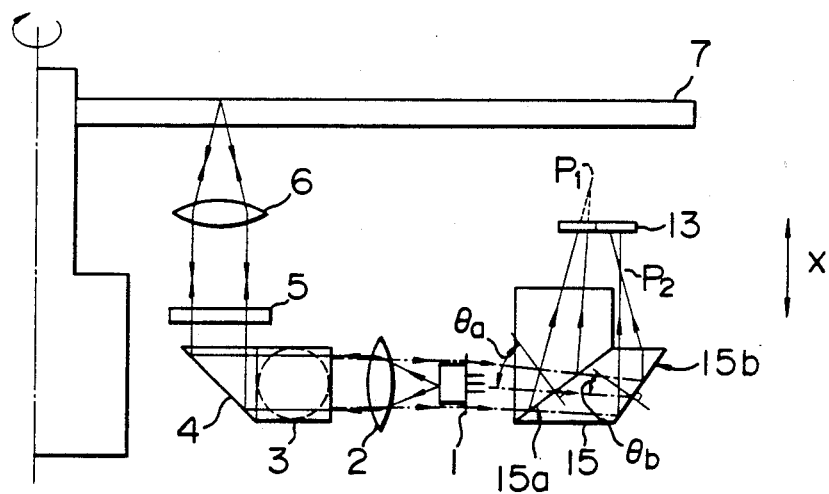
Figure 3:
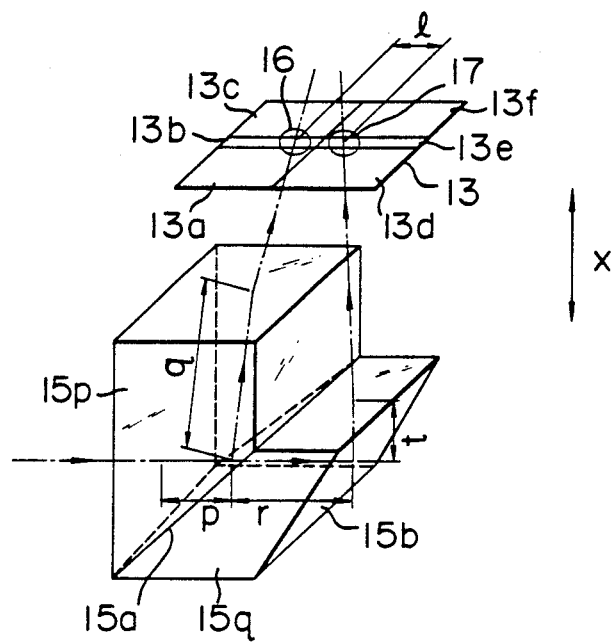
FIG. 3 is a perspective view of the focusing prism employed in the present invention.

FIGS. 2a and 2b are a front elevational view and a side elevational view, respectively, which in combination show one embodiment of the present invention, while FIG. 3 is a perspective view of a focusing prism 15 shown in FIG. 2a.

In the optical system shown in FIGS. 2a and 2b: the reference numeral 1 denotes a light source which is, for example, constituted by a semiconductor laser; 2 a condenser lens employed to condense the laser beam emitted from the semiconductor laser; 3 a polarization beam splitter which transmits or reflects the laser beam in accordance with the direction of polarization of the laser beam; 4 a prism for changing the optical path; 5 a λ/4 plate; 6 a converging lens for narrowing the laser beam to a minute spot of light; and 7 a disk which rotates in the direction of the arrow. Thus, a signal track 24 on the disk 7 is irradiated with the spot of light, whereby a signal is recorded or a recorded signal is reproduced, or reproduction of a signal alone is effected. The light reflected from the disk 7 passes through the λ/4 plate 5 again, where the direction of polarization of the light is changed, and this light is reflected by the polarization beam splitter 3. The reference numerals 8, 11 and 15 respectively represent a convex lens, a dividing prism and a focusing prism. The light reflected from the disk 7 is narrowed by the convex lens 8 and divided by the dividing prism 11 into two portions which are respectively led toward a photodetector 14 and the focusing prism 15. The photodetector 14 is divided into two portions 14a and 14b in such a manner that both divided portions face in the direction in which light enters the same. Thus, a servo control signal TE which is employed to effect the above-described tracking servo control is obtained from the difference between the respective outputs of the photodetector portions 14a and 14b. The reflected light which is led toward the focusing prism 15 is substantially halved by the latter and applied to a photodetector 13. The focusing prism 15 is arranged as shown in FIG. 3, in which the reference numeral 15a denotes a half-mirror which substantially halves the reflected light, while the numeral 15b represents a reflecting mirror which reflects approximately 100% of the light applied thereto. In this case, the respective inclination angles of the mirrors 15a and 15b are so set that the incident angles $\theta a$ and $\theta b$ of the light entering these mirrors are representively given by $\theta a = 45° + \Delta\theta$ and $\theta b = 45° - \Delta\theta$. The arrangement is such that it is possible to obtain as desired the distance l between the respective centers of beam spots 16 and 17 on the photodetector 13 by changing the above-described $\Delta\theta$. Further, the focusing prism 15 has an L-shaped side surface so that the two optical path lengths equal each other, one of them being the optical path length $S_1 = (p+q) \times n_1$ (where $n_1$ represents the refractive index of a first focusing prism portion 15p) of a first reflected light which is to form the beam spot 16 when it passes through the focusing prism 15, and the other being the optical path length $S_2 = p \times n_1 + (r+t) \times n_2$ (where $n_2$ represents the refractive index of a second focusing prism portion 15q) of a second reflected light which is to form the beam spot 17 when it passes through the focusing prism 15. Since these optical path lengths are equal to each other, the respective aberrations of the beam spots 16 and 17 caused by the focusing prism 15 are also equal to each other. Accordingly, it is possible to obtain two beam spots which are completely identical to each other.

The respective image-forming positions $P_1$ and $P_2$ of the first and second reflected light rays are offset from each other in the direction of the arrow X by an amount corresponding to the difference between their respective reflection positions in the focusing prism 15. The photodetector 13 is disposed at the approximate center between the image-forming positions $P_1$ and $P_2$, the photodetector 13 being divided into six portions 13a to 13f in such a manner that all of them face in the direction in which light enters the photodetector 13. The photodetector 13 is irradiated with the beam spots 16 and 17 which are substantially equal to each other in terms of their diameter as well as being larger in width than the divided photodetector portions 13b and 13e. Representing the respective output currents of the six photodetector portions 13a to 13f by Ia to If, the focusing servo control signal FE is obtained from the following equation:

$$FE = (Ib + Id + If) - (Ia + Ic + Ie) \quad (1)$$

Figure 4A:
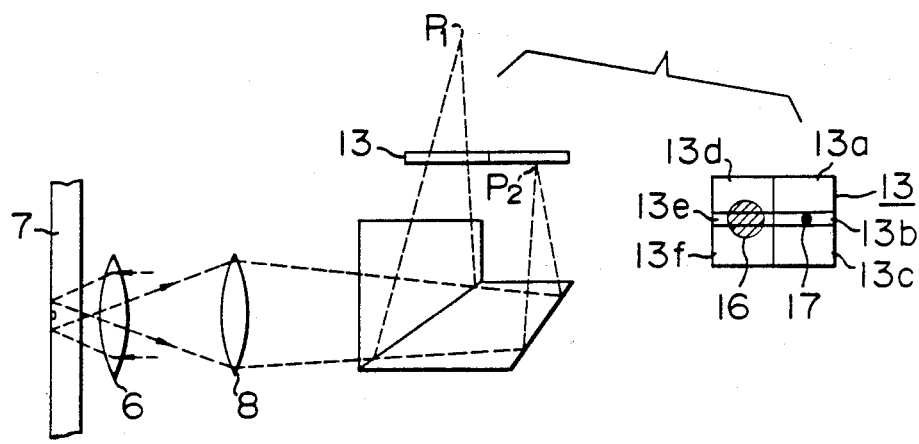
FIGS. 4a, 4b and 4c illustrate a focusing method according to the present invention, FIG. 4a showing a case where the distance between a disk and a converging lens is undesirably smaller than a desired value, FIG. 4b showing a case where the distance therebetween is optimal for obtaining an exactly focused position, and FIG. 4c showing a case where the above-described distance is undesirably larger than the desired value.
Figure 4B:
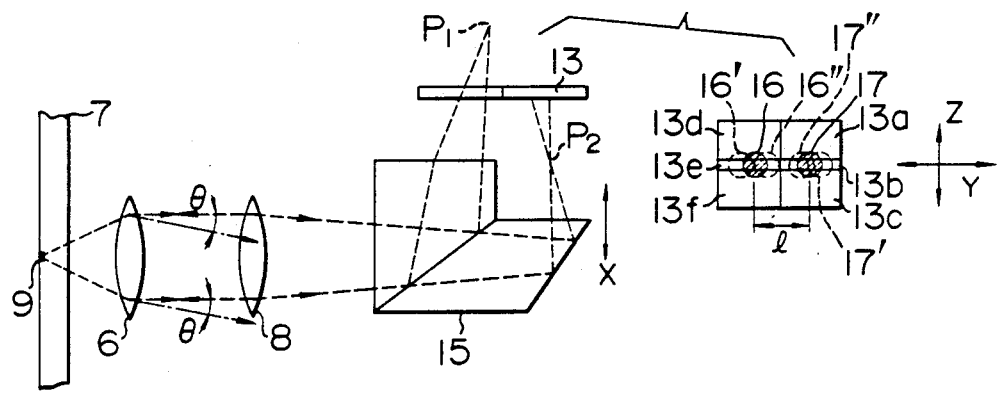
Figure 4C:
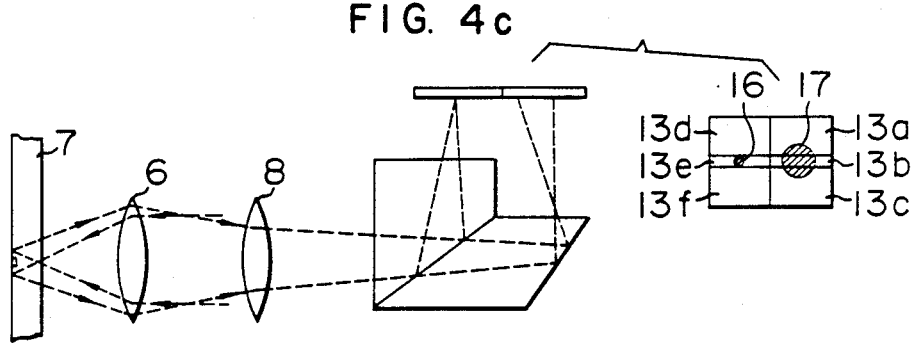

Referring next to FIGS. 4a, 4b and 4c which are similar to FIGS. 2a and 2b but simplified for the purpose of a description of a method of obtaining a focusing servo control signal alone, those constituent elements which are similar to the ones shown in FIGS. 2a and 2b are denoted by the same reference numerals. FIG. 4a shows a case where the distance between the converging lens 6 and the surface of the disk 7 is smaller than a desired value; FIG. 4b shows a case where the distance therebetween is equal to the desired value, that is, the incident light is exactly focused on the surface of the disk 7 (referred to as the "focused position", hereinafter); and FIG. 4c shows a case where the above-described distance is larger than the desired value.

Referring first to FIG. 4a, when the distance between the converging lens 6 and the disk 7 is smaller than the desired value, the image-forming positions $P_1$ and $P_2$ of the reflected light rays which are narrowed by the convex lens 8 are remote from the photodetector 13. In such a case, the diameter of the beam spot 17 formed on the photodetector 13 by the second reflected light becomes smaller than the diameter of the beam spot 16 formed by the first reflected light. In consequence, the quantity of light which is received by the photodetector portions 13b, 13d and 13f is larger than the quantity of light received by the photodetector portions 13a, 13c and 13e. On the other hand, when the distance between the converging lens 6 and the disk 7 is larger than the desired value as shown in FIG. 4c, the diameter of the beam spot 17 becomes larger than the diameter of the beam spot 16 and in such a case the quantity of light which is received by the photodetector portions 13a, 13c and 13e is larger than the quantity of light received by the photodetector portions 13b, 13d and 13f.

Further, when the converging lens 6 and the disk 7 are in the focused position as shown in FIG. 4b, the respective diameters of the beam spots 16 and 17 become substantially equal to each other, and the quantity of light received by the photodetector portions 13b, 13d and 13f and the quantity of light received by the photodetector portions 13a, 13c and 13e consequently become equal to each other. Accordingly, it is possible to obtain a focusing servo control signal FE by obtaining the difference between the respective output currents of two sets of photodetector portions in accordance with the equation (1).

Thus, it is possible to realize a focusing servo control by effecting a servo control such that the condition of Ia+Ic+Ie=Ib+Id+If is satisfied. Further, it is also possible to obtain a focusing servo control signal from FE=Ib−Ie on a principle which is similar to the above.

In the arrangement shown in FIGS. 4a, 4b and 4c, when there is a change in environmental conditions such as a temperature change or a shock applied to the optical system, the following problems may arise: (1) the photodetector 13 may by displaced in the Y- or Z-axis direction; (2) the parallel rays entering the convex lens 8 may be offset by an angle $\theta$ as shown by the one-dot chain line in FIG. 4b; and (3) the light source 1 (see FIG. 2) may be displaced in the Y- or Z-axis direction. When such displacement of an optical element or an undesirable shift of the optical axis occurs, both the beam spots 16 and 17 may be displaced in the Y- or Z-axis direction. However, if the distance l between the beam spots 16 and 17 is sufficiently larger than the displacement thereof, the respective displacements of the beam spots 16 and 17 cancel each other out, so that there is no effect on the focusing servo control signal represented by the equation (1), that is, FE=(Ib+Id+If)−(Ia+Ic+Ie). One example of cancellation of the respective displacements of the beam spots 16 and 17 in the Z-axis direction will now be explained. For example, if the beam spots 16 and 17 are displaced in the +Z-axis direction, the quantity of light which is received by the photodetector portions 13a and 13d increases, while the quantity of light received by the photodetector portions 13b, 13e and 13c, 13f decreases. However, since the respective shapes of the beam spots 16 and 17 are completely the same in terms of the quality and the size, the focusing servo control signal is given as follows:

$$FE = \{(Ib - \alpha) + (Id + \beta) + (If - \gamma)\} -$$
$$\{(Ie - \alpha) + (Ia + \beta) + (Ic - \gamma)\}$$
$$= (Ib + Id + If) - (Ie + Ia + Ic)$$

Accordingly, there is no change in the focusing servo control signal (no change in the focused position).

Incidentally, the image of the signal track 24 on the disk 7 is projected on the photodetector 13 in parallel to the Z-axis direction. Consequently, the ±first-order diffraction light which is caused by the signal track 24 appears in symmetry with the 0-order diffraction light with respect to the Z-axis, that is, the diffracted light is applied to the photodetector 13 in the form of beam spots 16', 16" and 17', 17" as shown in FIG. 4b. The set of the beam spots 16' and 16" and the set of the beam spots 17' and 17" alternately change in terms of the intensity of light every time the spot of light beam which is applied to the disk 7 through the converging lens 6 crosses the signal track 24 (e.g., during a retrieval operation), thus causing a change in the output of each of the photodetector portions, which fact leads to a disturbance appearing on the focusing servo control signal FE. By virtue of the arrangement of the present invention, however, if the intensity of the beam spot 16', for example, increases, the intensity of the beam spot 17' also increases. Therefore, even if both the beam spots 16 and 17 are offset in the Z-axis direction, employment of a focusing servo control signal such as that respresented by the equation (1), that is, $FE = (Ib + Id + If) - (Ia + Ic + Ie)$, allows the above-described disturbance to be completely cancelled, and the displacement of the beam spots 16 and 17 does not appear on the focusing servo control signal as a disturbance.

Figure 5:
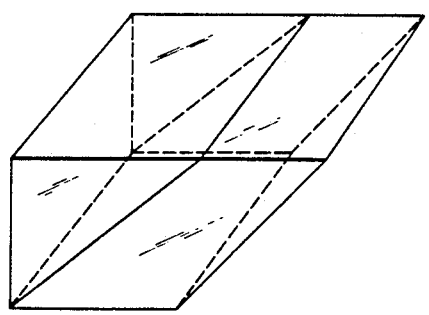
FIG. 5 shows another example of the focusing prism employed in the present invention.

Although description has been made with respect to a focusing prism with an L-shaped side surface, it is also possible to obtain the advantageous effects of the invention by employing a focusing prism with a trapezoidal side surface such as that shown in FIG. 5 if the respective optical path length $S_1 = (p+q) \times n_1$ and $S_2 = p \times n_1 + (r+t) \times n_2$ of the reflected rays in the focusing prism are relatively small and the focal length of the convex lens 8 is sufficiently large, since in such a case the aberration caused by the focusing prism is favorably small.

Figure 1A:
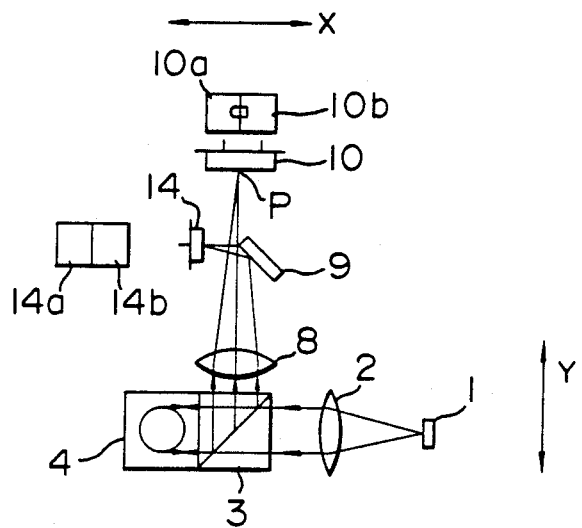
FIGS. 1a and 1b show the arrangement of a conventional optical head.
Figure 1B:
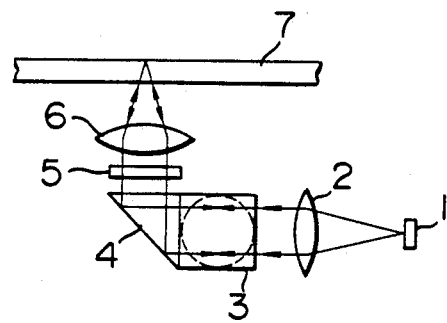
Figure 6A:
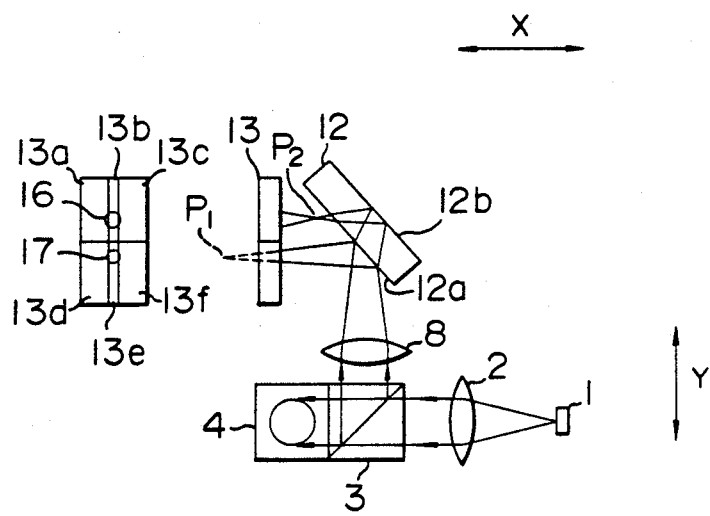
FIGS. 6a and 6b show another embodiment of the present invention in which a focusing plate is employed.
Figure 6B:
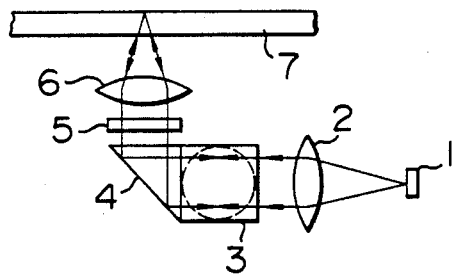

Referring next to FIGS. 6a and 6b which shows another embodiment of the present invention, the same constituent elements as those shown in FIG. 1 are denoted by the same reference numerals. The light reflected from the disk 7 is, as shown in FIGS. 6a and 6b, separated into two portions, that is, first and second reflected rays, by means of a focusing plate 12. In this case, the focusing plate 12 is, for example, constituted by a single glass plate. The respective intensities of the first and second reflected rays become equal to each other by selecting the reflectivity and transmittance of the upper surface 12a of the focusing plate 12 and the reflectivity of the lower surface 12b thereof such that the relation expressed by the following equation is satisfied:

$$Ra = Ta^2 \times Rb$$

Where Ra represents the reflectivity of the upper surface 12a, Ta the transmittance of the upper surface 12a, and Rb the reflectivity of the lower surface 12b.

The respective image-focusing positions $P_1$ and $P_2$ of the first and second reflected rays are offset from each other in the X-axis direction by an amount corresponding to the difference between their respective optical path lengths in the focusing plate 12. The photodetector 13 is disposed in the approximate center between the image-forming positions $P_1$ and $P_2$, the photodetector 13 being divided into six portions 13a to 13f in such a manner that all of them face in the direction in which light enters the same. The photodetector 13 is irradiated with the beam spots 16 and 17 which are substantially equal to each other in terms of their diameter as well as being larger in width than the divided photodetector portions 13b and 13e. Representing the respective output currents of the photodetector portions 13a to 13f shown in FIG. 6a by Ia to If, a focusing servo control signal FE is obtained from $FE = (Ib + Id + If) - (Ia + Ic + Ie)$ on a principle which is similar to that described in relation to FIG. 3. On the other hand, a tracking servo control signal TE is obtained from $TE = (Ia + If) - (Id + Ic)$.

It is to be noted that the reason why the tracking servo control signal TE is obtained by adding together the respective output currents Ia and If or Id and Ic of the divided portions on the photodetector 13 which are located thereon in diagonal relation to each other is that the second reflected light which is reflected from the lower surface 12b of the focusing plate 12 is inverted at the image-forming position $P_2$ before being applied to the photodetector portions 13a to 13c. Since the tracking servo control signal is thus obtained from the difference between the sums of the two sets of output currents of the divided phtodetector portions which are in diagonal relation to each other, even if the photodetector 13 or the beam spots 16 and 17 are displaced in the Z-axis direction owing to a change in environmental conditions such as a temperature change or a shock applied to the optical system, it is still possible to obtain an accurate tracking servo control signal. Thus, the arrangement of the present invention also displays the advantage that any undesirable shift of the optical axis or any displacement of an optical element has no effect on the tracking servo control signal.

Figure 7:
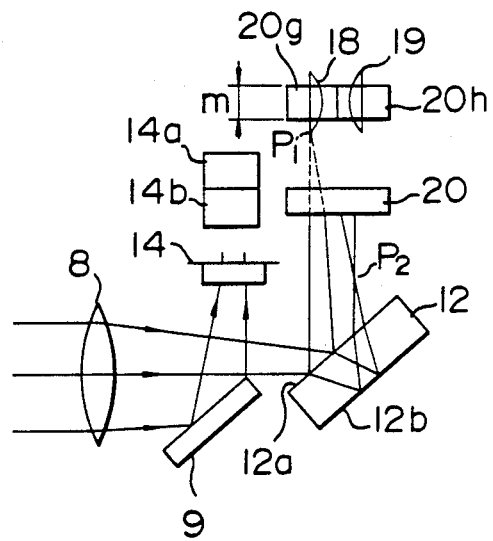
FIG. 7 shows still another embodiment of the present invention in which another type of focusing plate is employed.
Figure 8A:
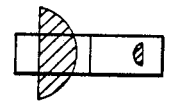
FIGS. 8a, 8b and 8c show the light which is applied to the photodetector shown in FIG. 7.
Figure 8B:
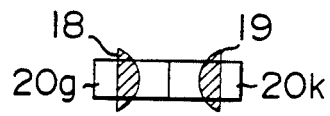
Figure 8C:
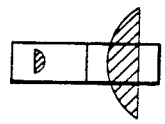

FIG. 7 shows still another embodiment of the present invention in which the above-described focusing method is employed. For the purpose of describing only that portion of the arrangement to which the invention is applied, FIG. 7 simply shows the portion of the arrangement shown in FIG. 2 which is constituted by the convex lens 8 and the constituent elements lying behind it. A part of the reflected light which is converged by the convex lens 8 is spacially divided into two light beams, one of them being led to a photodetector 14 which is employed to detect the above-described tracking servo control signal. The other light beam is separated by the focusing plate 12 into the first and second reflected rays which respectively form beam spots 18 and 19 on a photodetector 20. The width m of the photodetector 20 is set such as to be smaller than the diameter of the beam spots 18 and 19. The photodetector 20 is divided into two portions 20g and 20h and is disposed at the approximate center between the respective image-forming position $P_1$ and $P_2$ of the first and second reflected rays. FIGS. 8a, 8b and 8c show the change in the shape of the beam spots 18 and 19 in accordance with the distance between the converging lens 6 and the disk 7, in which: FIG. 8a shows a case where the distance therebetween is undesirably smaller than a desired value; FIG. 8b shows a case where the above-described distance is equal to the desired value, the converging lens 6 and the disk 7 are in the focused position; and FIG. 8c shows a case where the above-described distance is undesirably larger than the desired value. As will be clear from FIGS. 8a, 8b and 8c, the focusing servo control signal FE is obtained from the difference between the respective output currents Ig and Ih of the photodetector portions 20g and 20h on a principle which is similar to that described in relation to FIGS. 4a, 4b and 4c. In the embodiment of the invention shown in FIG. 7 also, the focused position is hardly affected by a change in environmental conditions such as a temperature change, and the S/N ratio of the focusing servo control signal is excellent.

Figure 9A:
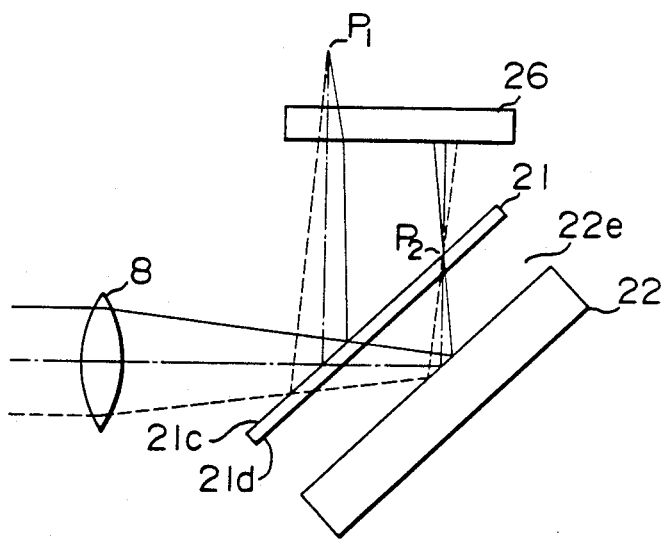
FIGS. 9a and 9b, and FIGS. 10a and 10b show further embodiments of the present invention in which other types of focusing plates are employed.
Figure 9B:
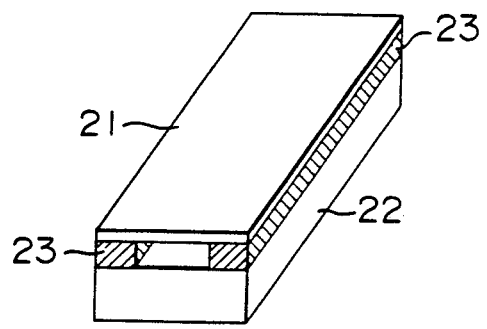

FIGS. 9a and 9b show another example of the focusing plate employed in the present invention, FIG. 9a showing the portion of the optical path of the reflected light which is constituted by the convex lens 8 and the elements lying behine it, and FIG. 9b being a perspective view of this focusing plate. This focusing plate is constituted by upper and lower focusing plate portions 21 and 22. The reflectivity and transmittance of the upper surface 21c of the upper focusing plate portion 21 are respectively represented by Rc and Tc, while the transmittance of the lower surface 21d of the upper focusing plate portion 21 is represented by Td, and the reflectivity of the upper surface 22e of the lower focusing plate portion 22 is represented by Re. In this case, if the above-described reflectivities and transmittance are selected such that the condition of $Rc = Tc^2 \times Td^2 \times Re$ is satisfied, then the intensity of the first reflected light which is reflected by the upper focusing plate portion 21 and the intensity of the second reflected light which is reflected by the lower focusing plate portion 22 become equal to each other. The reference numeral 23 shown in FIG. 9b denotes a spacer employed to integrally connect the upper and lower focusing plate portions 21 and 22 with an air layer interposed therebetween, while the numeral 26 represents a photodetector which serves as those which are denoted by the reference numerals 13 and 20 in FIGS. 2a, 2b, 3, 4a, 4b) 4c and 7, respectively.

Since the focusing plate shown in FIGS. 9a and 9b includes the air layer, it is possible to enlarge the distance between the respective image-forming positions $P_1$ and $P_2$ of the first and second reflected rays as well as reduce the thickness of the upper focusing plate portion 21. It is therefore possible to reduce the degree of aberration of the second reflected light caused by the focusing plate.

Figure 10A:
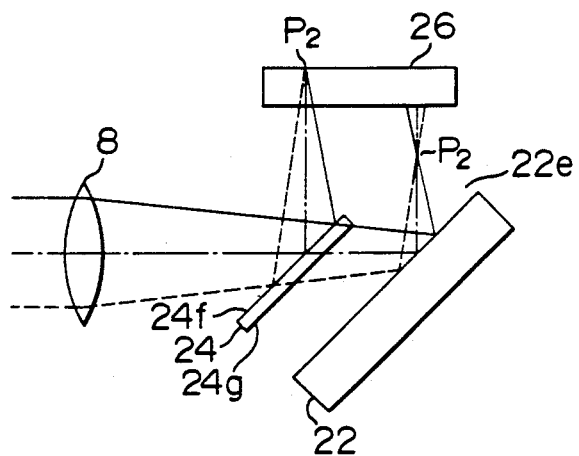
Figure 10B:
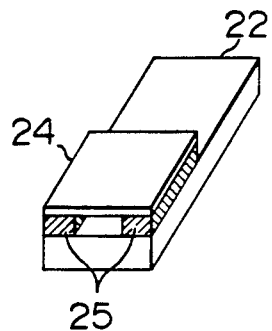

Referring next to FIGS. 10a and 10b, there is shown still another example of the focusing plate employed in the present invention. FIG. 10a shows the portion of the optical path of the reflected light which is constituted by the convex lens 8 and the elements lying behind it, while FIG. 10b is a perspective view of this focusing plate. This focusing plate is constituted by upper and lower focusing plate portions 24 and 22. The reflectivity and transmittance of the upper surface 24f of the upper focusing plate portion 24 are respectively represented by Rf and Tf, while the transmittance of the lower surface 24g of the upper focusing plate portion 24 is represented by Tg, and the reflectivity of the upper surface 22e of the lower focusing plate portion 22 is represented by Re. The upper and lower focusing plate portions 24 and 22 are arranged so that the second reflected light which is reflected by the lower focusing plate portion 22 does not pass through the upper focusing plate portion 24 again, and the above-described reflectivities and transmittance are selected so that the condition of $Rc = Tf \times Tg \times Re$ is satisfied, whereby the intensity of the first reflected light which is reflected by the upper focusing plate portion 24 and the intensity of the second reflected light which is reflected by the lower focusing plate portion 22 become equal to each other. The reference numeral 25 in FIG. 10b denotes a spacer which is employed to integrally connect the upper and lower focusing plate portions 24 and 22 with an air layer interposed therebetween.

The focusing plate shown in FIGS. 10a and 10b advantageously makes it possible for light to be effectively utilized, since the second reflected light does not pass through the upper focusing plate portion 24.

As has been described above, the arrangement of the present invention offers the following various advantages. Namely, the focused position is hardly offset at all by displacement of an optical element or any undesirable shift of the optical axis which may be caused by a temperature change or a shock applied to the optical system, which fact advantegeously makes it possible to realize stable recording and reproducing operations. Further, since the focusing servo control signal is obtained from two beam spots which are identical to each other in terms of the intensity and the shape, noise components which may be superposed on the reflected light are cancelled and therefore do not appear on the focusing servo control signal, thus making it possible to obtain a focusing servo control signal with an excellent S/N ratio.

Furthermore, the dividing lines which divide each of the beam spots 16 and 17 on the photodetector into three portions extend in the direction orthogonal to the signal track 24 on the disk 7, that is, the Z-axis direction. For this reason, even if the beam spots 16 and 17 are slightly offset in the Z-axis direction, it is possible to completely cancel any disturbance which may result from the ±first-order diffraction light which is caused at the signal track 24 on the disk 7 and appear in parallel to the above-described dividing lines and which would otherwise appear on the focusing servo control signal. It is therefore possible to obtain a focusing servo control signal with an excellent S/N ratio.

Additionally, since the tracking servo control signal is obtained from the output currents of the divided photodetector portions which are located diagonally with respect to each other, the tracking servo control signal is not affected either by any displacement of an optical element or an undesirable shift of the optical axis, as in the case of the focusing servo control signal.

Although the invention has been described through specific terms, it is to be noted here that the described embodiments are not exclusive and various changes and modifications may be imparted thereto without departing from the scope of the invention which is limited solely by the appended claims.

What is claimed is:

1. An optical head in which the light emitted from a single light source is narrowed to a minute spot of light and applied to a recording medium thereby to effect recording and reproduction, or reproduction alone, said optical head comprising:

at least one lens for forming the image of the light reflected from said recording medium;

a focusing plate disposed in a portion of an optical path ahead of the position where the image of said reflected light is formed, said focusing plate having first and second reflecting surfaces which substantially halve the intensity of said reflected light and cause the halved reflected light rays to form respective images at separate positions which are not on the same optical path nor in the same plane; and a photodetector disposed at the approximate center between said image-forming positions and along the respective optical paths of said separated reflected light rays, said photodetector being divided into at least two portions so that said portions individually receive said separated reflected light rays, each of said portions having a width smaller than the diameter of a beam spot received thereby, whereby a focusing servo control signal is obtained from the difference between the quantities of light rays respectively received by said photodetector portions.

2. An optical head according to claim 1, wherein said photodetector is divided into two portions so that said portions are able to individually receive said reflected light rays separated by said focusing plate, each of said portions being further divided into three portions so that it is possible for said three portions to individually receive the central portion and both peripheral portions of the reflected light received thereby, whereby a focusing serve control signal is obtained from the difference between the quantities of light rays respectively received by said peripheral portions and said central portion.

3. An optical head according to claim 2, wherein a tracking servo control signal is obtained from the difference between the quantities of light rays respectively received by the peripheral portions among said three divided portions of said photodetector.

4. An optical head according to claim 2, wherein said focusing plate is constituted by a single glass sheet.

5. An optical head according to claim 2, wherein said focusing plate is constituted by two glass sheets with an air layer interposed therebetween.

6. An optical head according to claim 2, wherein said focusing plate is arranged such that the light reflected from said second reflecting surface does not pass through said first reflecting surface again.

7. An optical head according to claim 1, wherein a tracking servo control signal is obtained from the difference between the quantities of light rays respectively received by the peripheral portions along said divided portions of said photodetector.

8. An optical head according to claim 7, wherein said focusing plate is constituted by a single glass sheet.

9. An optical head according to claim 7, wherein said focusing plate is constituted by two glass sheets with an air layer interposed therebetween.

10. An optical head according to claim 7, wherein said focusing plate is arranged such that the light reflected from said second reflecting surface does not pass through said first reflecting surface again.

11. An optical head according to claim 1, wherein said focusing plate is constituted by a single glass sheet.

12. An optical head according to claim 1, wherein said focusing plate is constituted by two glass sheets with an air layer interposed therebetween.

13. An optical head according to claim 1, wherein said focusing plate is arranged such that the light reflected from said second reflecting surface does not pass through said first reflecting surface again.

14. An optical head in which the light emitted from a single light source is narrowed to a minute spot of light and applied to a recording medium thereby to effect recording and reproduction, or reproduction alone, said optical head comprising:

at least one lens for forming the image of the light reflected from said recording medium;

a focusing means disposed in a portion of an optical path ahead of the position where the image of said reflected light is formed, said focusing means having first and second reflecting surfaces which substantially halve the intensity of said reflected light and cause the halved reflected light rays to form respective images at separate positions which are not on the same optical path nor in the same plane, said focusing means further being arranged such that the respective optical distances which said halved reflected light rays travel to their respective image-forming positions are substantially equal to each other; and a photodetector disposed at the approximate center between said image-forming positions and along the respective optical paths of said separated reflected light rays, said photodetector being divided into at least two portions so that said portions individually receive said separated reflected light rays, each of said portions having a width smaller than the diameter of a beam spot received thereby, whereby a focusing servo control signal is obtained from the difference between the quantities of light rays respectively received by said photodetector portions.

15. An optical head according to claim 14, wherein said focusing means comprises a focusing prism, and said photodetector is divided into two portions so that said portions are able to individually receive said reflected light rays separated by said focusing prism, each of said portions being further divided into three portions so that it is possible for said three portions to individually receive the central portion and both peripheral portions of the reflected light received thereby, whereby a focusing servo control signal is obtained from the difference between the quantities of light rays respectively received by said peripheral portions and said central portion.

16. An optical head according to claim 15, wherein a tracking servo control signal is obtained from the difference between the quantities of light rays respectively received by the peripheral portions among said three divided portions of said photodetector.

17. An optical head according to claim 15, wherein said first and second reflecting surfaces of said focusing prism are slanted so that the incident angle of light entering each of said first and second reflecting surfaces is $45° \pm \Delta\theta$, where $\Delta\theta$ corresponds to the distance between said respective images.

18. An optical head according to claim 14, wherein a tracking servo control signal is obtained from the difference between the quantities of light rays respectively received by the peripheral portions among said divided portions of said photodetector.

19. An optical head according to claim 18, wherein said first and second reflecting surfaces of said focusing prism are slanted so that the incident angle of light entering each of said first and second reflecting surfaces is 45°±Δθ, where Δθ corresponds to the distance between said respective images.

20. An optical head according to claim 14, wherein said first and second reflecting surfaces of said focusing means are slanted so that the incident angle of light entering each of said first and second reflecting surfaces is 45°±Δθ, where Δθ corresponds to the distance between said respective images.

* * * * *